United States Patent
Xia et al.

(10) Patent No.: US 7,130,344 B2
(45) Date of Patent: *Oct. 31, 2006

(54) ADAPTIVE EQUALIZER HAVING A VARIABLE STEP SIZE INFLUENCED BY OUTPUT FROM A TRELLIS DECODER

(75) Inventors: Jingsong Xia, Mundelein, IL (US); Richard W. Citta, Oak Park, IL (US); Scott M. LoPresto, Mount Prospect, IL (US); Wenjun Zhang, Shanghai (CN); Hangbin Song, Toronto (CA)

(73) Assignee: Micronas Semiconductors, Inc., Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/701,047

(22) Filed: Nov. 4, 2003

(65) Prior Publication Data

US 2004/0091039 A1    May 13, 2004

Related U.S. Application Data

(63) Continuation of application No. 09/875,720, filed on Jun. 6, 2001, now Pat. No. 6,829,297.

(51) Int. Cl.
*H03H 7/40* (2006.01)
(52) U.S. Cl. ..................................... 375/233
(58) Field of Classification Search ........ 375/229–233, 375/265, 346, 350; 708/322, 323
See application file for complete search history.

(56) References Cited

U.S. PATENT DOCUMENTS

| | | | |
|---|---|---|---|
| 4,567,599 A | 1/1986 | Mizoguchi | |
| 4,712,221 A | 12/1987 | Pearce et al. | |
| 4,815,103 A | 3/1989 | Cupo et al. | |
| 4,833,693 A | 5/1989 | Eyuboglu | |
| 4,856,031 A | 8/1989 | Goldstein | |
| 4,866,395 A | 9/1989 | Hostetter | |
| 4,989,090 A | 1/1991 | Campbell et al. | |
| 5,052,000 A | 9/1991 | Wang et al. | |
| 5,056,117 A | 10/1991 | Gitlin et al. | |
| 5,058,047 A | 10/1991 | Chung | |
| 5,127,051 A | 6/1992 | Chan et al. | |
| 5,134,480 A | 7/1992 | Wang et al. | |

(Continued)

FOREIGN PATENT DOCUMENTS

EP    0524559 B1    5/1997

(Continued)

OTHER PUBLICATIONS

Demodulation of Cochannel QAM Signals (continued); Error Detection/Correction; pp 1-3, http://www.appsig.com/papers/1813f/813f_4.html.

(Continued)

*Primary Examiner*—Khanh Tran
(74) *Attorney, Agent, or Firm*—O'Shea, Getz & Kosakowski, P.C.

(57) ABSTRACT

An adaptive equalizer comprises a decision device; a decision feedback equalizer coupled to the decision device; an FIR filter coupled to the decision device; and a trellis decoder coupled to the decision device, adapted to provide a reliability output and a decoded output. An error signal is generated by subtracting an output of the decision feedback equalizer from an output of the decision device, the error signal being used to update coefficients of the taps of the FIR filter and the decision feedback equalizer. A magnitude of the change to the coefficients is selected based at least in part the reliability output of the trellis decoder.

48 Claims, 10 Drawing Sheets

U.S. PATENT DOCUMENTS

| | | |
|---|---|---|
| 5,142,551 A | 8/1992 | Borth et al. |
| 5,210,774 A | 5/1993 | Abbiate et al. |
| 5,278,780 A | 1/1994 | Eguchi |
| 5,311,546 A | 5/1994 | Paik et al. |
| 5,453,797 A | 9/1995 | Nicolas et al. |
| 5,471,508 A | 11/1995 | Koslov |
| 5,506,636 A | 4/1996 | Patel et al. |
| 5,508,752 A | 4/1996 | Kim et al. |
| 5,532,750 A | 7/1996 | De Haan et al. |
| 5,537,435 A | 7/1996 | Carney et al. |
| 5,568,098 A | 10/1996 | Horie et al. |
| 5,568,521 A | 10/1996 | Williams et al. |
| 5,588,025 A | 12/1996 | Strolle et al. |
| 5,619,154 A | 4/1997 | Strolle et al. |
| 5,648,987 A | 7/1997 | Yang et al. |
| 5,668,831 A | 9/1997 | Claydon et al. |
| 5,692,014 A | 11/1997 | Basham et al. |
| 5,757,855 A | 5/1998 | Strolle et al. |
| 5,781,460 A | 7/1998 | Nguyen et al. |
| 5,789,988 A | 8/1998 | Sasaki |
| 5,802,461 A | 9/1998 | Gatherer |
| 5,805,242 A | 9/1998 | Strolle et al. |
| 5,828,705 A | 10/1998 | Kroeger et al. |
| 5,835,532 A | 11/1998 | Strolle et al. |
| 5,862,156 A | 1/1999 | Huszar et al. |
| 5,870,433 A | 2/1999 | Huber et al. |
| 5,872,817 A | 2/1999 | Wei |
| 5,877,816 A | 3/1999 | Kim |
| 5,894,334 A | 4/1999 | Strolle et al. |
| 5,995,154 A | 11/1999 | Heimburger |
| 6,005,640 A | 12/1999 | Strolle et al. |
| 6,012,421 A | 1/2000 | Kusche et al. |
| 6,034,734 A | 3/2000 | De Haan et al. |
| 6,034,998 A | 3/2000 | Takashi et al. |
| 6,044,083 A | 3/2000 | Citta et al. |
| 6,069,524 A | 5/2000 | Mycynek et al. |
| 6,133,785 A | 10/2000 | Bourdeau |
| 6,133,964 A | 10/2000 | Han |
| 6,141,384 A | 10/2000 | Wittig et al. |
| 6,145,114 A | 11/2000 | Crozier et al. |
| 6,154,487 A | 11/2000 | Murai et al. |
| 6,178,209 B1 | 1/2001 | Hulyalkar et al. |
| 6,195,400 B1 | 2/2001 | Maeda |
| 6,198,777 B1 | 3/2001 | Feher |
| 6,219,379 B1 | 4/2001 | Ghosh |
| 6,222,891 B1 | 4/2001 | Liu et al. |
| 6,226,323 B1 | 5/2001 | Tan et al. |
| 6,233,286 B1 | 5/2001 | Wei |
| 6,240,133 B1 | 5/2001 | Sommer et al. |
| 6,249,544 B1 | 6/2001 | Azazzi et al. |
| 6,260,053 B1 | 7/2001 | Maulik et al. |
| 6,272,173 B1 | 8/2001 | Hatamian |
| 6,275,554 B1 | 8/2001 | Bouillet et al. |
| 6,278,736 B1 | 8/2001 | De Haan et al. |
| 6,304,614 B1 | 10/2001 | Abbaszadeh et al. |
| 6,307,901 B1 | 10/2001 | Yu et al. |
| 6,333,767 B1 | 12/2001 | Patel et al. |
| 6,356,586 B1 | 3/2002 | Krishnamoorthy et al. |
| 6,363,124 B1 | 3/2002 | Cochran |
| 6,411,341 B1 | 6/2002 | De Haan et al. |
| 6,411,659 B1 | 6/2002 | Liu et al. |
| 6,415,002 B1 | 7/2002 | Edwards et al. |
| 6,421,378 B1 | 7/2002 | Fukuoka et al. |
| 6,438,164 B1 | 8/2002 | Tan et al. |
| 6,452,639 B1 | 9/2002 | Wagner et al. |
| 6,466,630 B1 | 10/2002 | Jensen |
| 6,483,872 B1 | 11/2002 | Nguyen |
| 6,490,007 B1 | 12/2002 | Bouillet et al. |
| 6,493,409 B1 | 12/2002 | Lin et al. |
| 6,507,626 B1 | 1/2003 | Limberg |
| 6,535,553 B1 | 3/2003 | Limberg et al. |
| 6,570,919 B1 | 5/2003 | Lee |
| 6,573,948 B1 | 6/2003 | Limberg |
| 6,611,555 B1 | 8/2003 | Smith et al. |
| 6,665,695 B1 | 12/2003 | Brokish et al. |
| 6,724,844 B1 | 4/2004 | Ghosh |
| 6,734,920 B1 | 5/2004 | Ghosh et al. |
| 6,829,298 B1 | 12/2004 | Abe et al. |
| 2001/0048723 A1 | 12/2001 | Oh |
| 2002/0024996 A1 | 2/2002 | Agazzi et al. |
| 2002/0051498 A1 | 5/2002 | Thomas et al. |
| 2002/0136329 A1 | 9/2002 | Liu et al. |
| 2002/0154248 A1 | 10/2002 | Wittig et al. |
| 2002/0172275 A1 | 11/2002 | Birru |
| 2002/0172276 A1 | 11/2002 | Tan et al. |
| 2002/0186762 A1 | 12/2002 | Xia et al. |
| 2002/0191716 A1 | 12/2002 | Xia et al. |
| 2003/0058967 A1 | 3/2003 | Lin et al. |
| 2003/0206600 A1 | 11/2003 | Vankka |
| 2004/0057538 A1 | 3/2004 | Sathiavageeswaran et al. |

FOREIGN PATENT DOCUMENTS

| | | |
|---|---|---|
| EP | 0752185 B1 | 7/2002 |
| WO | WO 00/27033 | 5/2000 |
| WO | WO 00/27066 | 5/2000 |
| WO | WO 01/01650 A1 | 1/2001 |
| WO | WO 01/13516 A2 | 2/2001 |
| WO | WO 01/43310 A2 | 6/2001 |
| WO | WO 01/43384 A2 | 6/2001 |

OTHER PUBLICATIONS

Demodulation of Cochannel QAM Signals (continued); Simulation Results; pp. 1-6; http://www.appsig.com/papers/1813f/813f_5.html.

De Haan et al. "DeInterlacing-an Overview", Proceedings of the IEEE, vol. 86, No. 9, pp. 1837-1856 (Sep. 1998).

De Haan et al. "De-Interlacing of Video Data", IEEE Transactions on Consumer Electronics, vol. 43, No. 3, pp. 819-824 (Aug. 1997).

Wang et al. "Time-Recursive DeInterlacing for IDTV and Pyramid Coding", Elsevier Science Publishers B. V., vol. 2, No. 3, pp. 365-374 (Oct. 1990).

ADAPTIVE EQUALIZER HAVING A VARIABLE STEP SIZE INFLUENCED BY OUTPUT FROM A TRELLIS DECODER

This application is a continuation of Ser. No. 09/875,720 Jun. 6, 2001 U.S. Pat. No. 6,829,297.

BACKGROUND

Equalizers are an important element in many diverse digital information applications, such as voice, data, and video communications. These applications employ a variety of transmission media. Although the various media have differing transmission characteristics, none of them is perfect. That is, every medium induces variation into the transmitted signal, such as frequency-dependent phase and amplitude distortion, multipath reception, other kinds of ghosting, such as voice echoes, and Rayleigh fading. In addition to channel distortion, virtually every sort of transmission also suffers from noise, such as additive white gausian noise ("AWGN"). Equalizers are therefore used as acoustic echo cancelers (for example in full-duplex speakerphones), video deghosters (for example in digital television or digital cable transmissions), signal conditioners for wireless modems and telephony, and other such applications.

One important source of error is intersymbol interference ("ISI"). ISI occurs when pulsed information, such as an amplitude modulated digital transmission, is transmitted over an analog channel, such as, for example, a phone line or an aerial broadcast. The original signal begins as a reasonable approximation of a discrete time sequence, but the received signal is a continuous time signal. The shape of the impulse train is smeared or spread by the transmission into a differentiable signal whose peaks relate to the amplitudes of the original pulses. This signal is read by digital hardware, which periodically samples the received signal.

Each pulse produces a signal that typically approximates a sinc wave. Those skilled in the art will appreciate that a sinc wave is characterized by a series of peaks centered about a central peak, with the amplitude of the peaks monotonically decreasing as the distance from the central peak increases. Similarly, the sinc wave has a series of troughs having a monotonically decreasing amplitude with increasing distance from the central peak. Typically, the period of these peaks is on the order of the sampling rate of the receiving hardware. Therefore, the amplitude at one sampling point in the signal is affected not only by the amplitude of a pulse corresponding to that point in the transmitted signal, but by contributions from pulses corresponding to other bits in the transmission stream. In other words, the portion of a signal created to correspond to one symbol in the transmission stream tends to make unwanted contributions to the portion of the received signal corresponding to other symbols in the transmission stream.

This effect can theoretically be eliminated by proper shaping of the pulses, for example by generating pulses that have zero values at regular intervals corresponding to the sampling rate. However, this pulse shaping will be defeated by the channel distortion, which will smear or spread the pulses during transmission. Consequently, another means of error control is necessary. Most digital applications therefore employ equalization in order to filter out ISI and channel distortion.

Generally, two types of equalization are employed to achieve this goal: automatic synthesis and adaptation. In automatic synthesis methods, the equalizer typically compares a received time-domain reference signal to a stored copy of the undistorted training signal. By comparing the two, a time-domain error signal is determined that may be used to calculate the coefficient of an inverse function (filter). The formulation of this inverse function may be accomplished strictly in the time domain, as is done in Zero Forcing Equalization ("ZFE") and Least Mean Square ("LMS") systems. Other methods involve conversion of the received training signal to a spectral representation. A spectral inverse response can then be calculated to compensate for the channel distortion. This inverse spectrum is then converted back to a time-domain representation so that filter tap weights can be extracted.

In adaptive equalization the equalizer attempts to minimize an error signal based on the difference between the output of the equalizer and the estimate of the transmitted signal, which is generated by a "decision device." In other words, the equalizer filter outputs a sample, the decision device determines what value was most likely transmitted, and the adaptation logic attempts to keep the difference between the two small. The main idea is that the receiver takes advantage of the knowledge of the discrete levels possible in the transmitted pulses. When the decision device quantizes the equalizer output, it is essentially discarding received noise. A crucial distinction between adaptive and automatic synthesis equalization is that adaptive equalization does not require a training signal.

Error control coding generally falls into one of two major categories: convolutional coding and block coding (such as Reed-Solomon and Golay coding). At least one purpose of equalization is to permit the generation of a mathematical "filter" that is the inverse function of the channel distortion, so that the received signal can be converted back to something more closely approximating the transmitted signal. By encoding the data into additional symbols, additional information can be included in the transmitted signal that the decoder can use to improve the accuracy of the interpretation of the received signal. Of course, this additional accuracy is achieved either at the cost of the additional bandwidth necessary to transmit the additional characters, or of the additional energy necessary to transmit at a higher frequency.

A convolutional encoder comprises a K-stage shift register into which data is clocked. The value K is called the "constraint length" of the code. The shift register is tapped at various points according to the code polynomials chosen. Several tap sets are chosen according to the code rate. The code rate is expressed as a fraction. For example, a ½ rate convolutional encoder produces an output having exactly twice as many symbols as the input. Typically, the set of tapped data is summed modulo-2 (i.e., the XOR operation is applied) to create one of the encoded output symbols. For example, a simple K=3, ½ rate convolutional encoder might form one bit of the output by modulo-2-summing the first and third bits in the 3-stage shift register, and form another bit by modulo-2-summing all three bits.

A convolutional decoder typically works by generating hypotheses about the originally transmitted data, running those hypotheses through a copy of the appropriate convolutional encoder, and comparing the encoded results with the encoded signal (including noise) that was received. The decoder generates a "metric" for each hypothesis it considers. The "metric" is a numerical value corresponding to the degree of confidence the decoder has in the corresponding hypothesis. A decoder can be either serial or parallel—that is, it can pursue either one hypothesis at a time, or several.

One important advantage of convolutional encoding over block encoding is that convolutional decoders can easily use "soft decision" information. "Soft decision" information essentially means producing output that retains information about the metrics, rather than simply selecting one hypothesis as the "correct" answer. For an overly-simplistic example, if a single symbol is determined by the decoder to have an 80% likelihood of having been a "1" in the transmission signal, and only a 20% chance of having been a "0", a "hard decision" would simply return a value of 1 for that symbol. However, a "soft decision" would return a value of 0.8, or perhaps some other value corresponding to that distribution of probabilities, in order to permit other hardware downstream to make further decisions based on that degree of confidence.

Block coding, on the other hand, has a greater ability to handle larger data blocks, and a greater ability to handle burst errors.

FIG. 1 illustrates a block diagram of a typical digital communication receiver, including channel coding and equalization, indicated generally at 100. The receiver 100 comprises a demodulation and sync component 110, which converts the received analog signal back into a digital format. The receiver 100 further comprises an equalizer 120, an inner decoder 130, a de-interleaver 140, and an outer decoder 150. The inner coding is typically convolutional coding, while the outer coding is typically block coding, most often Reed-Solomon coding. The convolutional and block coding are generally combined in order to exploit the complementary advantages of each.

FIG. 2 is a diagram of an equalizer 120 such as is commonly used in the digital receiver 100 shown in FIG. 1. Typically, the equalizer 120 includes a controller 228, a finite impulse response ("FIR") filter 222, a decision device 226, and a decision feedback equalizer ("DFE") 224. The FIR filter 222 receives the input signal 221. The FIR filter 222 is used to cancel pre-ghosts—that is, ghost signals that arrive before the main transmission signal. The decision device 226 examines its inputs and makes a decision as to which one of the received signals at its input is the signal to be transmitted to the output 229. The input to the decision device 226 is modified by a decision feedback equalizer 224, which is used to cancel post-ghosts—that is, ghost signals that arrive after the main transmission signal—and the residual signal generated by the FIR filter 222.

The decision device 226 is typically a hard decision device, such as a slicer. For example, in an 8VSB system, the slicer can be a decision device based upon the received signal magnitude, with decision values of 0, ±2, 4, and ±6, in order to sort the input into symbols corresponding to the normalized signal values of ±1, ±3, ±5, and ±7. For another example, the slicer can be multi-dimensional, such as those used in quadrature amplitude modulation ("QAM") systems.

The controller 228 receives the input data and the output data and generates filter coefficients for both the FIR filter 222 and the decision feedback filter 224. Those skilled in the art will appreciate that there are numerous methods suitable for generating these coefficients, including LMS and RLS algorithms.

FIG. 3 illustrates further details of the equalizer 120 shown in FIG. 2. The input to the decision feedback equalizer 224 is output from the decision device 226, such as a slicer. The input data is delayed (F+M) stages, where F equals the number of stages in the FIR filter 222 and M equals the number of stages in the decision feedback equalizer 224. The equalizer 120 then passes the equalized data to a trellis decoder 350. An error signal 310 is generated by subtracting the input to the slicer 226 from its output. The error signal 310 is multiplied by a step size 320 before it is used to update the tap coefficients. Typically, the step size 320 is less than one, in order to permit the error signal to iteratively adjust the coefficient taps over multiple cycles, so that variations in channel response and noise are averaged out. Generally, the smaller the step size, the more severe the transient conditions under which the equalizer 120 can converge, though at the cost of slower convergence.

FIG. 4 shows the further details of a trellis encoder, shown generally at 400, suitable for use with the decision feedback equalizer 224 shown in FIG. 3. The trellis encoder 400 is the 8 VSB trellis encoder, precoder, and symbol mapper. As will be known by those skilled in the art, the 8 VSB trellis encoder 400 uses an 8-level, 3-bit, one dimensional constellation. As can be seen from FIG. 4, the 8 VSB trellis encoder 400 uses a ⅔ rate trellis code.

Typically, the trellis decoder 350 uses a Viterbi algorithm to decode the signal encoded by the 8 VSB trellis encoder 400. Typically, the trellis decoder 350 has a large number of stages—most often 16 or 24. The decoded output 229 is de-interleaved by the de-interleaver 140, and then sent to the outer decoder 150.

FIG. 5 shows a typical trellis diagram for an 8 VSB trellis code with n stages, shown generally at 500. The heavier line illustrates a current survive path. At each decoding clock cycle a new symbol is sent to the trellis decoder and the survive path is renewed. It will be appreciated that in a VSB system each sample contains one symbol, while in QAM or offset-QAM systems, each sample contains two symbols—one in the I channel, the other in the Q channel. However, regardless of the sample size, the coding and decoding is always performed symbol by symbol. At each stage a decision is made about which state is the most likely (i.e., which symbol was most likely transmitted), based on the survive path. For example, stage 1 gives the first estimation to the input, and stage 2 gives the second estimation to the input, etc. It will be appreciated that the survive path may change based on the decoding process as each new input symbol is received, so that the survive path may not be the same (though shifted one symbol) from one input sample time to another.

FIG. 6 shows the decoding error rate using a typical trellis decoder with the Viterbi decoding algorithm. As can be seen from the graph, while the system is running at the threshold, or even slightly below it, the error rate is lower after decoding, and the greater the number of decoding stages, the lower the error rate. It can also be seen that the error rate decreases greatly as the signal-to-noise ratio increases. Note that the threshold shown is the boundary in an 8 VSB system where the bit error rate after Reed-Solomon decoding is one in 106.

It will be appreciated that the equalizer 120 cannot converge if the decision device 226 makes too many errors. For example, it is believed that if a slicer 226 has an error rate greater than about 0.1 the equalizer will not converge. Therefore, at start up, when there are large channel distortions, equalizer 120 cannot start to work. It has to use training signals, if available, to compensate for the channel distortion, or use a different type of algorithm, such as blind equalization, to converge. Using the training signals alone, or in combination with blind equalization may still not be sufficient to converge. Even if they are sufficient, it can be difficult to determine this fact, or at what point the compensation becomes acceptable. Furthermore, in blind equalization methods the feedback portion of the equalizer 120 is not based on decisions from the decision device 226, and therefore a much higher resolution is required. Consequently, hardware that is substantially more complex may be required.

Those skilled in the art will also appreciate that during operation of an equalizer 120 it is desirable to reduce the step size when the signal-to-noise ratio is lower. To achieve that end, a stop-and-go algorithm could be used to stop the DFE 224 when the signal-to-noise ratio falls below some threshold. However, it can be difficult to determine the signal-to-noise ratio from instant to instant during operation. Therefore, most systems employing such an algorithm improve performance only under certain circumstances, and at the cost of poorer performance under other conditions.

What is needed is an equalizer in which the step size is adjusted in relation to the error rate from the decision device. The present invention is directed towards meeting these needs, as well as providing other advantages over prior equalizers.

SUMMARY OF THE INVENTION

A first embodiment adaptive equalizer comprises: a decision device; a decision feedback equalizer coupled to the decision device; an FIR filter coupled to the decision device; and a trellis decoder coupled to the decision device, adapted to provide a reliability output and a decoded output. An error signal is generated by subtracting an output of the decision feedback equalizer from an output of the decision device, the error signal being used to update coefficients of the taps of the FIR filter and the decision feedback equalizer. A magnitude of the change to the coefficients is selected based at least in part the reliability output of the trellis decoder.

A second embodiment adaptive equalizer comprises: a slicer; a decision feedback equalizer coupled to the slicer; an FIR filter coupled to the decision device; and a Viterbi decoder coupled to the decision device, adapted to provide a eliability output and a decoded output. The Viterbi decoder determines the reliability output by generating a soft output from each decoding stage of the Viterbi decoder, each soft output being equal to the difference between an accumulated metric of a survive path and a deleted path for the decoding stage, the soft output of a final decoding stage being used as the reliability output. An error signal is generated by subtracting an output of the equalizer from an output of the decision device, the error signal being used to update coefficients of the taps of the FIR filter and the decision feedback equalizer. A magnitude of the change to the coefficients is selected based at least in part the reliability output of the trellis decoder.

A third embodiment adaptive equalizer comprises: a decision device; an FIR filter coupled to the decision device; a decision feedback equalizer coupled to the decision device; and a trellis decoder coupled to the decision device and adapted to produce a reliability output and a decoded output. The error signal is generated by subtracting a delayed output of the equalizer from an output of the trellis decoder. A magnitude of change in the coefficients is selected based at least in part upon the reliability output.

A fourth embodiment adaptive equalizer comprises: a slicer; an FIR filter coupled to the slicer; a DFE coupled to the slicer; a Viterbi decoder coupled to the decision device and adapted to produce a reliability output and a decoded output; and a mapper coupled to receive the decoded output of the Viterbi decoder and to generate a mapped and scaled output. The error signal is generated by delaying an output of the DFE by a number of cycles equal to a number of cylces the Viterbi decoder uses to generate the reliability output and subtracting the delayed output of the DFE from an output of the Viterbi decoder. A magnitude of change in the coefficients is selected based at least in part upon the reliability output and at least in part upon the error signal.

DETAILED DESCRIPTION OF THE PREFERRED EMBODIMENT

Figure 1:
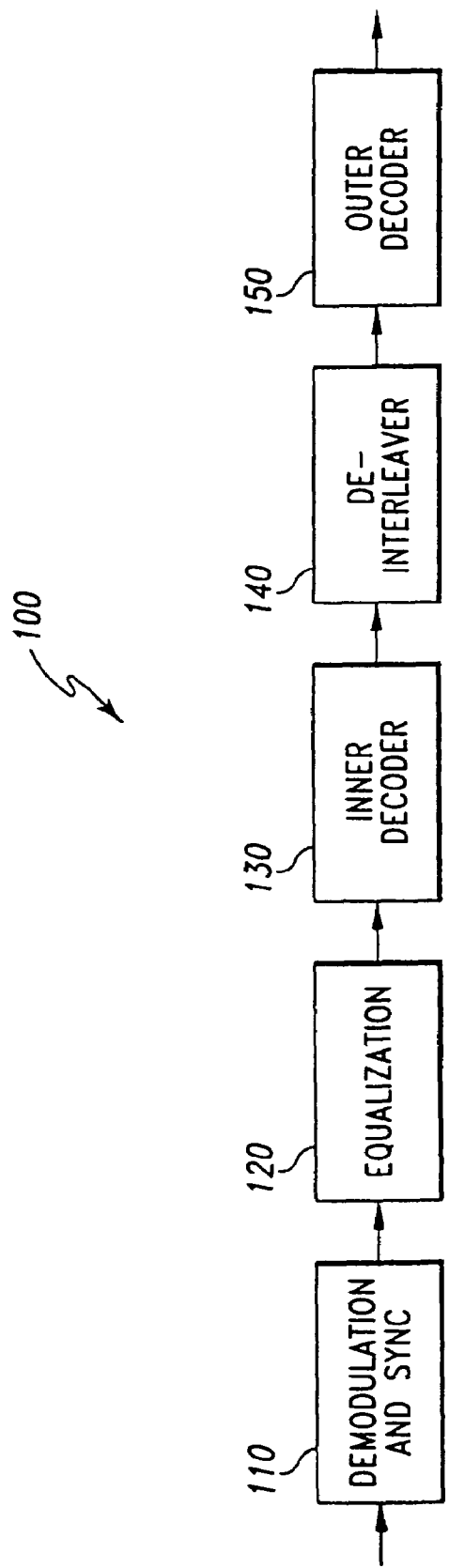
FIG. 1 is a block diagram of a prior art digital receiver.
Figure 2:
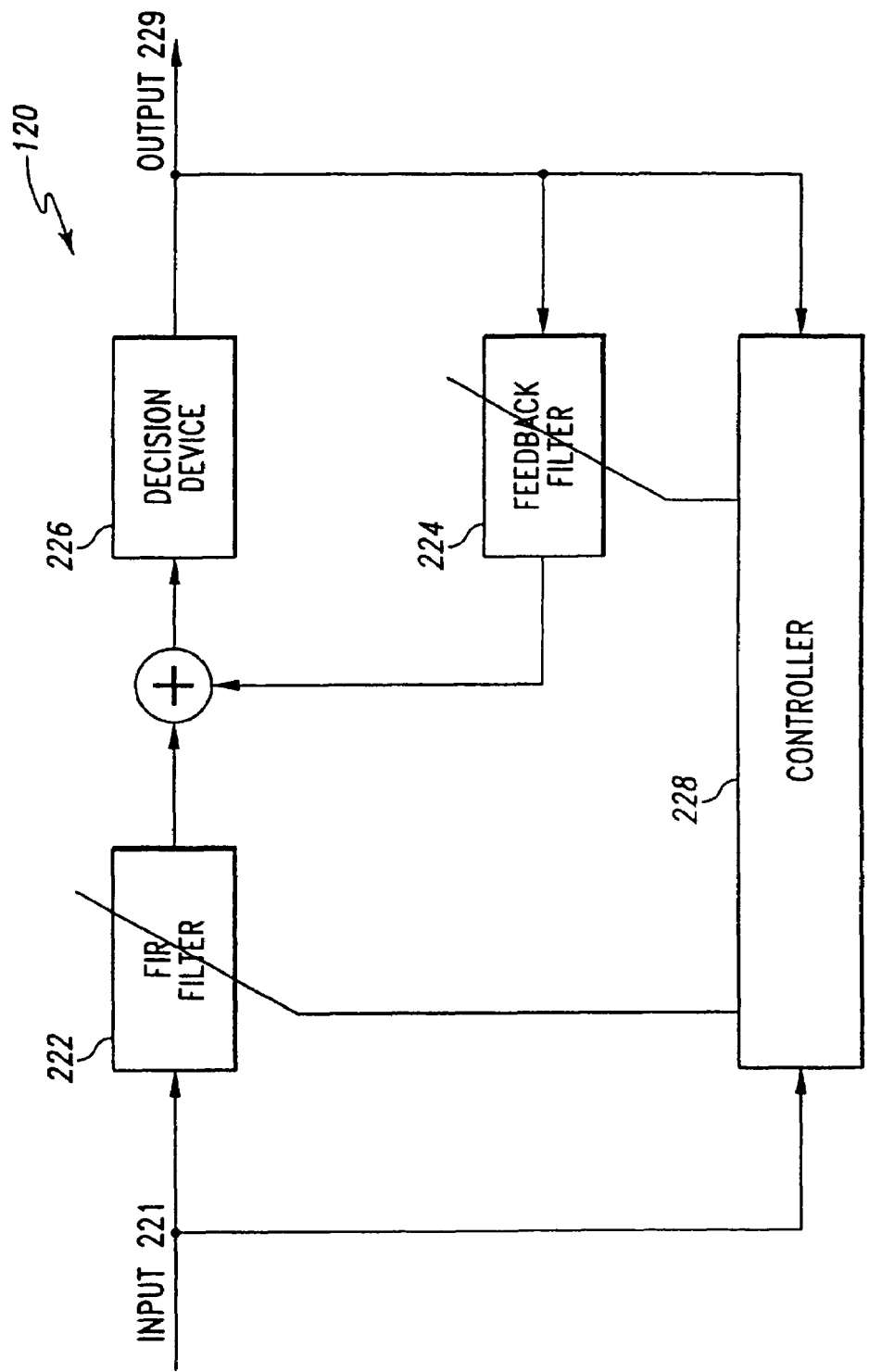
FIG. 2 is a diagram of a prior art equalizer suitable for use in the digital receiver of FIG. 1.
Figure 3:
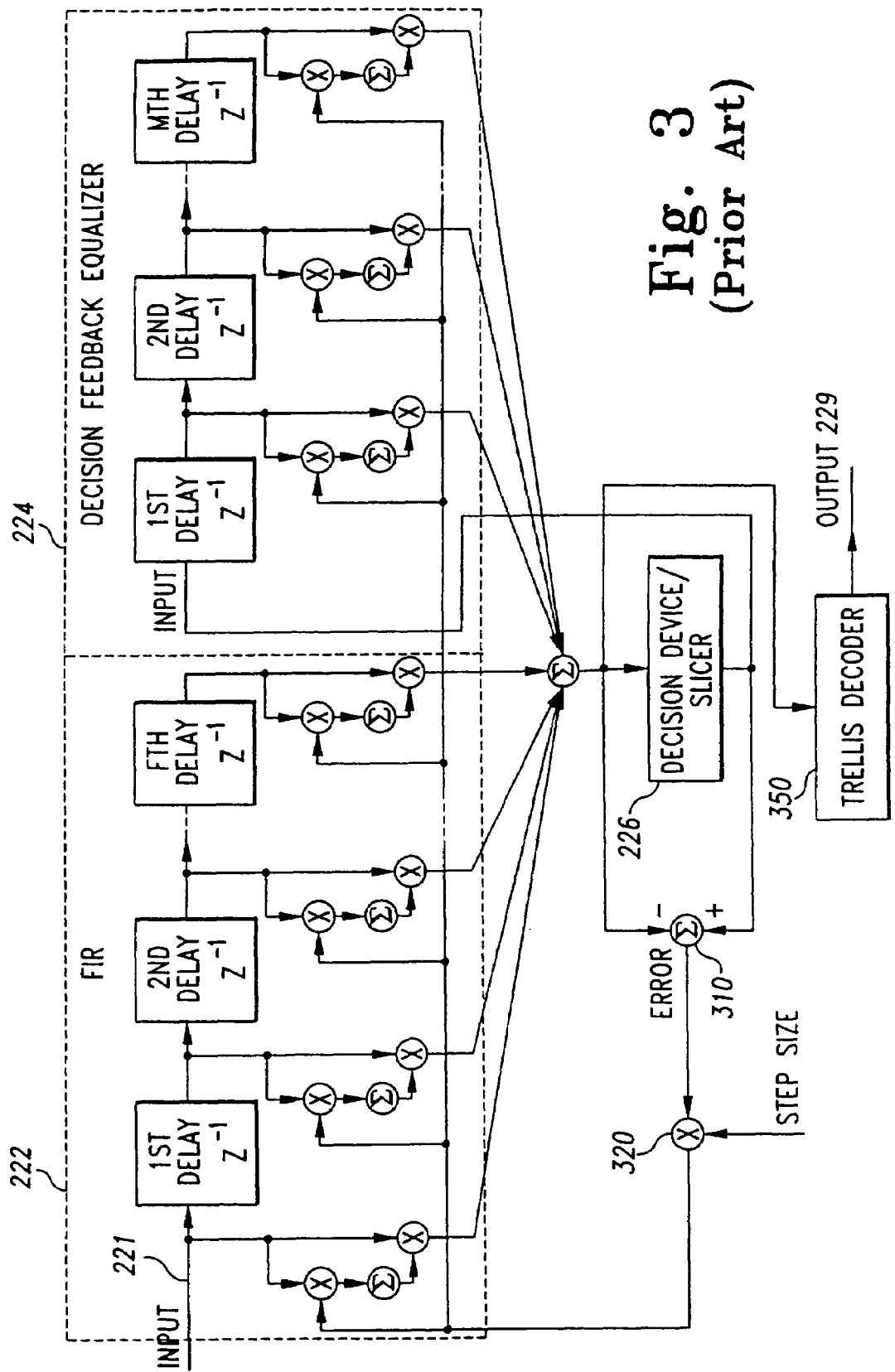
FIG. 3 is a diagram showing further details of the prior art decision feedback equalizer in FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates. In particular, although the invention is discussed in terms of an 8VSB system, it is contemplated that the invention can be used with other types of modulation coding, including, for example, QAM and offset-QAM.

Figure 7:
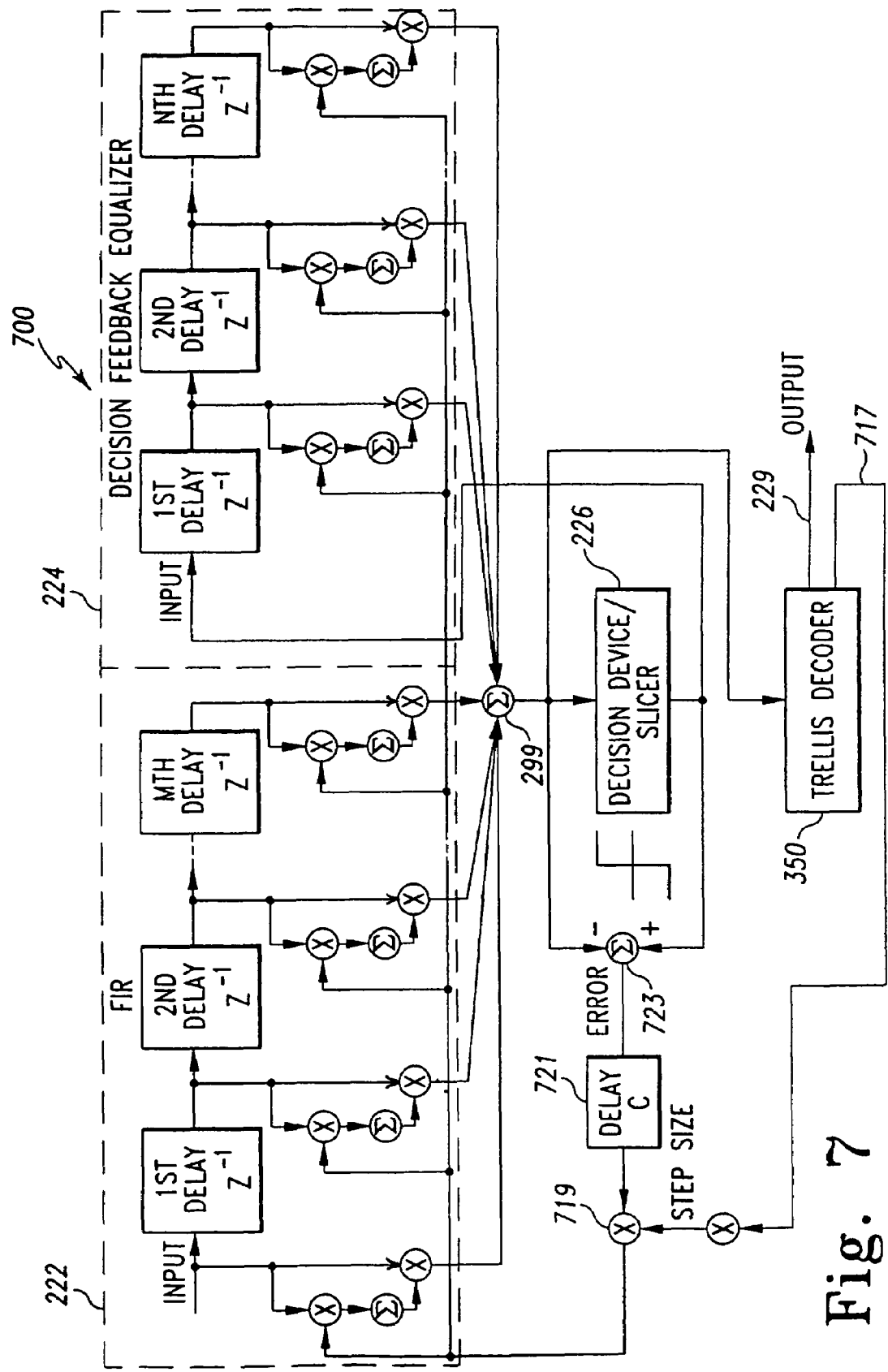
FIG. 7 is a diagram of a first embodiment adaptive equalizer according to the present invention.

FIG. 7 illustrates an equalizer embodying the present invention, indicated generally at 700. In addition to the usual output 229, the trellis decoder 350 outputs a signal 717, related to the reliability of the output signal 229. The reliability signal 717 is used to adjust the step size 719. The delay 721 is necessary to synchronize the output of the error signal 723 with the corresponding values for the reliability signal 717. That is, the length of the delay 721 should match the number of cycles necessary for the trellis decoder 350 to generate the reliability signal 717.

In certain embodiments, the trellis decoder 350 is a Viterbi decoder. As is known in the art, a Viterbi decoder compares two possible state transitions at each bit and determines which is the more likely to correspond to the originally transmitted signal. In the equalizers 700 employing a Viterbi decoder 350, at each decoding stage the decoding output is coupled with a soft output corresponding to the difference between the accumulated metric of the survive path and the deleted path. When the decoder reaches the last decoding stage, the decoded output 229 is determined along with the final soft output, which is used as the reliability signal 717.

It will be appreciated that there are many possible soft decoding algorithms available for decoding a trellis encoded signal, and that any of these soft decoding algorithms can be used to generate a reliability signal 717. It will also be appreciated that the reliability signal can be generated from any stage in the trellis decoder, though, generally, the later the stage used, the fewer decoding errors that will remain, so the more precisely the reliability signal 717 will correspond to the decoding quality.

It will be appreciated that by giving a lower weight to an unreliable error signal 723, such as is experienced at start up, the DFE 224 in the equalizer 700 can converge (albeit more slowly) due to the smaller step size, which permits averaging over a larger number of symbols. Conversely, when the reliability is higher, the error signal will be weighted more heavily, permitting faster convergence.

It will also be appreciated that the benefits of adjusting the step size can permit these improvements without the need to stop the DFE 224 entirely during periods of low reliability. In other words, the variable step size is an alternative to a start-and-stop algorithm in which the DFE 224 need not be hard-switched. Thus, the DFE 224 always works with decisions from the decision device 226. The DFE 224 in the equalizer 700 can therefore use a lower resolution and simpler hardware than would be necessary in an equalizer 120 employing a stop-and-go algorithm.

In certain other embodiments, an equalizer 700 according to the present invention employs a stop-and-go algorithm triggered by the value of the reliability signal 717. In certain of these embodiments, the DFE 224 and FIR filter 222 update their coefficients when the reliability signal 717 corresponds to a value above a pre-selected threshold. Such alternative embodiments are well suited for coping with impulse noise and severe but instantaneous channel distortions, since they can prevent the coefficients from being updated when the decision error rate is high enough to cause divergence, yet require little additional hardware relative to prior adaptive equalizers. Furthermore, even at startup, the equalizer 700 will converge, since the error signal generated from unreliable symbols will be ignored.

Figure 8:
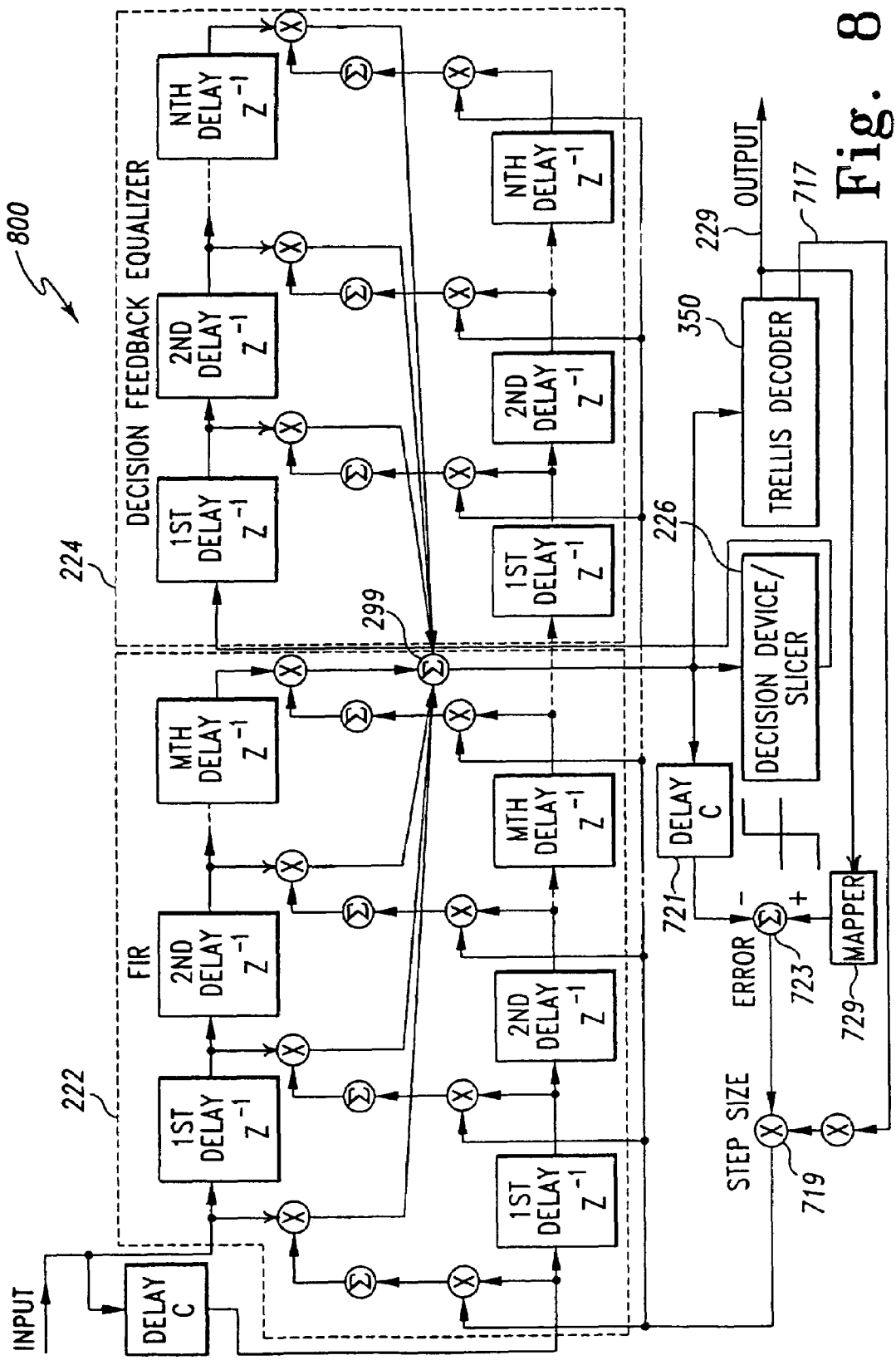
FIG. 8 is a diagram of an adaptive equalizer according to the present invention.

FIG. 8 shows a preferred embodiment equalizer according to the present invention, indicated generally at 800. The error 723 is generated from the difference between the output 299 of the equalizer 800 and the output 229 of the trellis decoder 350. Before the outputs 299 and 229 are used to generate the error signal, the output 229 is mapped and scaled back to data bits (1s and 0s) by a mapper 729, and the output 299 of the equalizer 800 is delayed by a delay 721 in order to synchronize it with the corresponding output of the trellis decoder 350. The reliability signal 717 is then used to set the step size applied to the error signal 723.

It will be appreciated that some encoding schemes have multiple independent encoders running in parallel. For example, in the 8 VSB system, there are typically 12 encoders. Typically, trellis code intrasegment interleaving is used in such systems. This uses a corresponding number of identical trellis encoders and precoders operating on interleaved data symbols. In a system with 12 parallel encoders, for example, the code interleaving is accomplished by encoding the 0th, 12th, 24th . . . symbols as on group, the 1st, 13th, 25th . . . symbols as a second group, the 2nd, 14th, 26th . . . symbols as a third group, and so on for a total of 12 groups.

Figure 4:
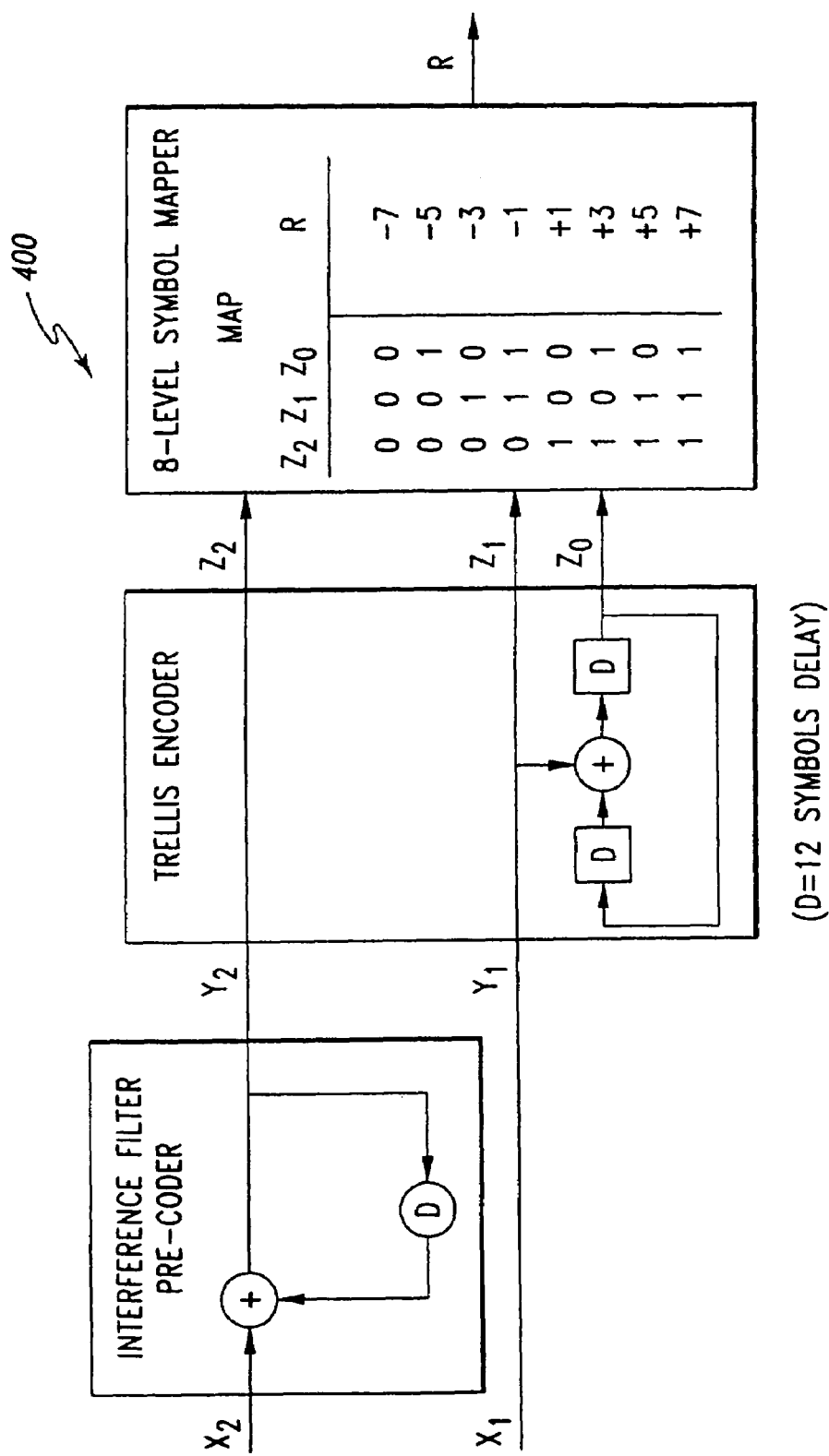
FIG. 4 is a diagram of a prior art 8VSB trellis encoder, precoder, and symbol mapper.
Figure 5:
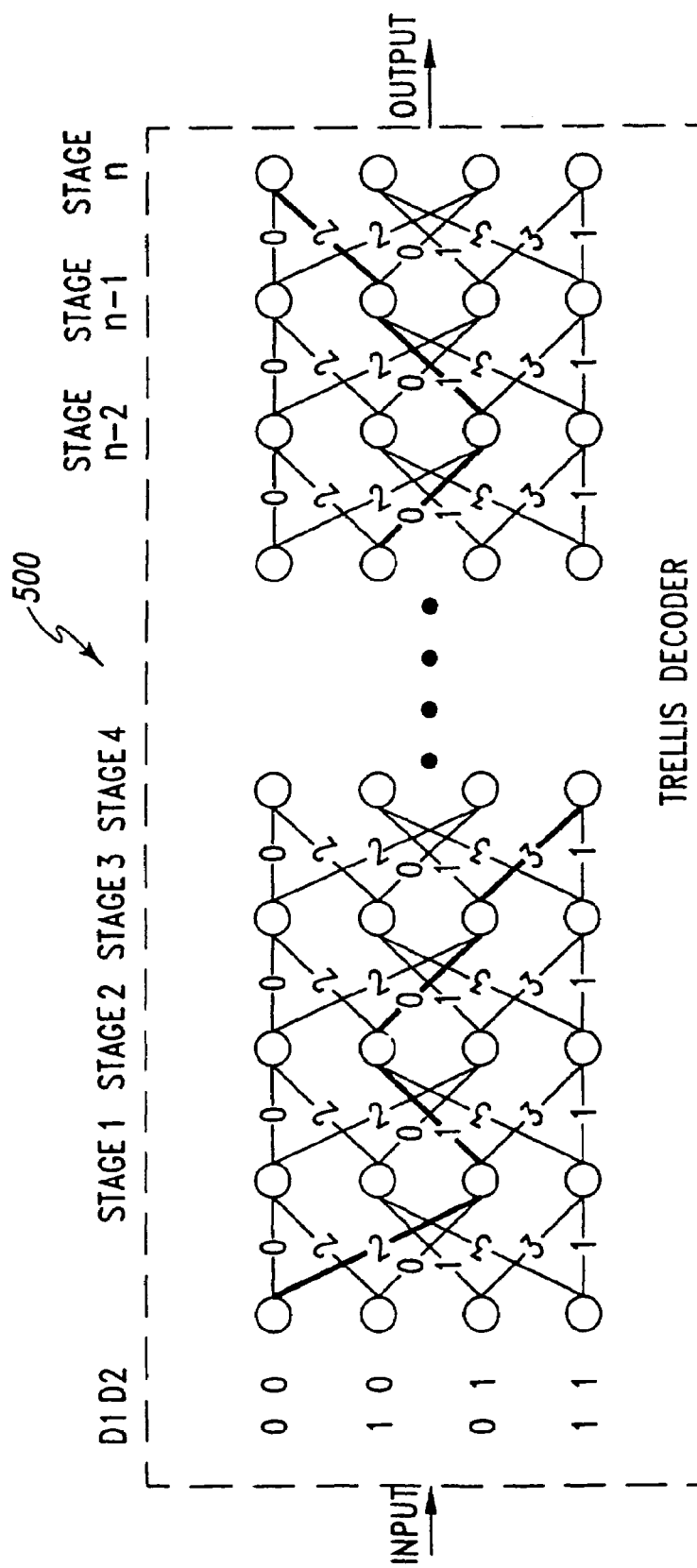
FIG. 5 is a prior art trellis diagram.
Figure 6:
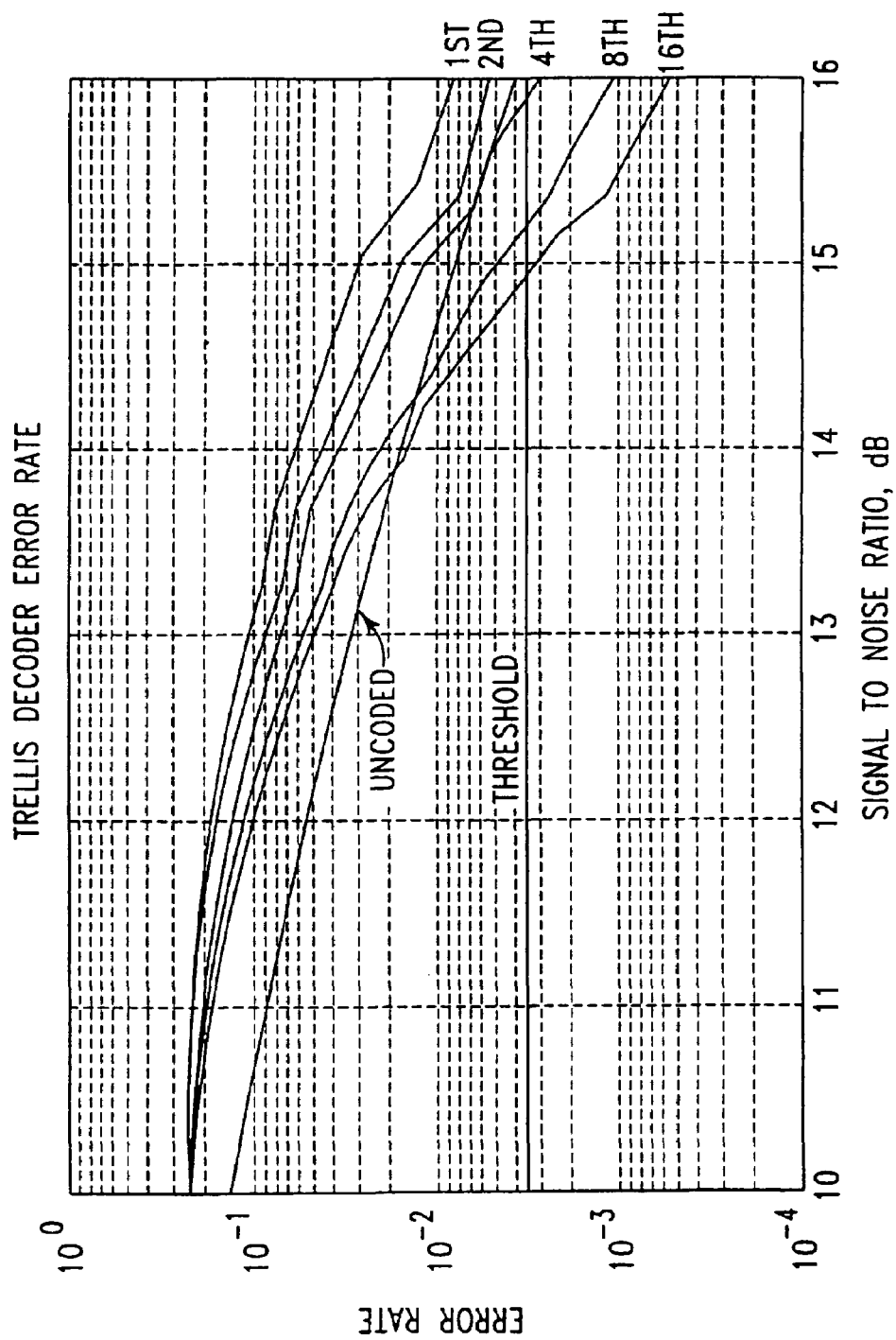
FIG. 6 is a graph showing the relationship between error rate and signal-to-noise ratio.
Figure 9:
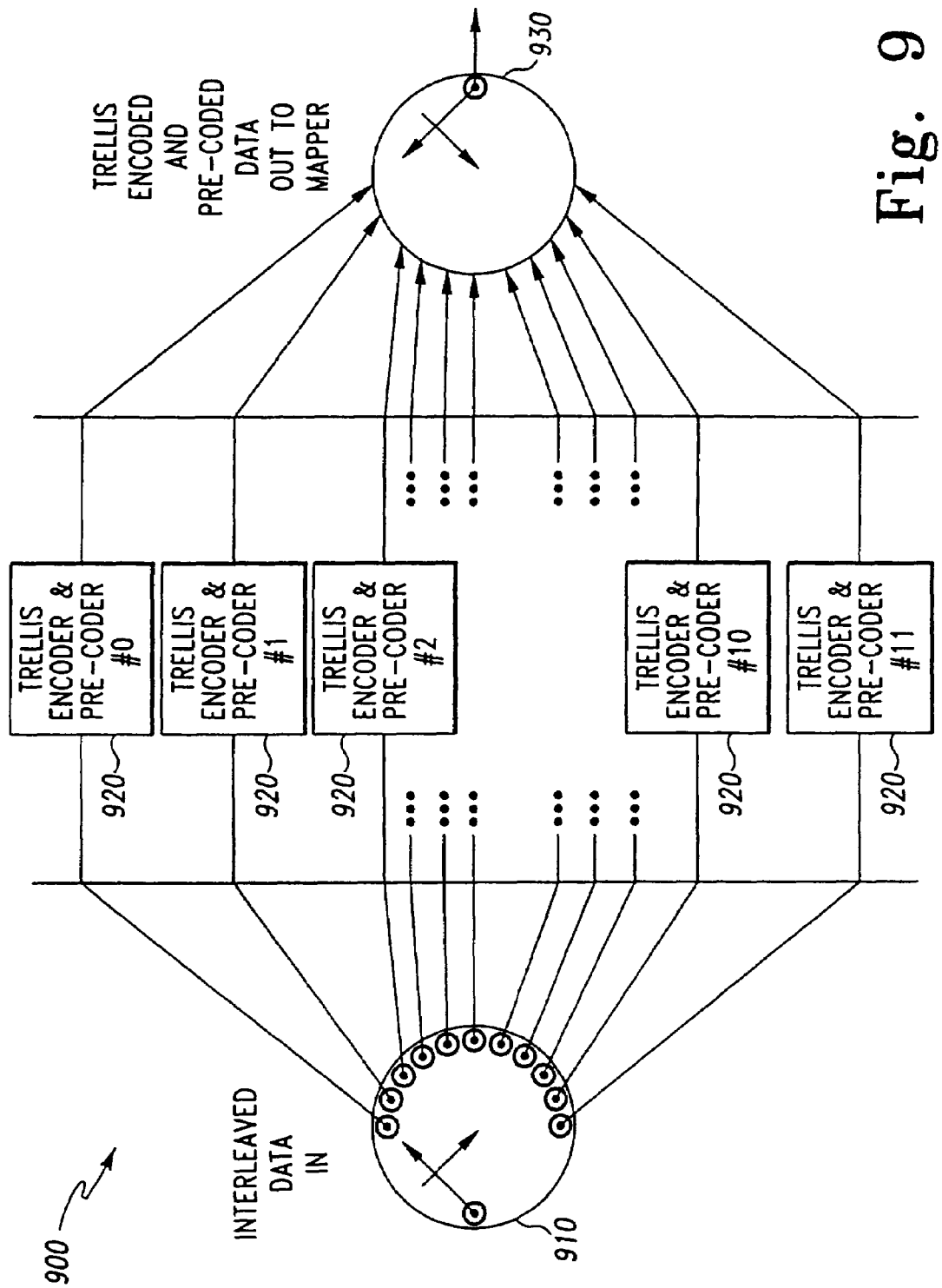
FIG. 9 is a diagram of a preferred embodiment trellis code interleaver according to the present invention.
Figure 10:
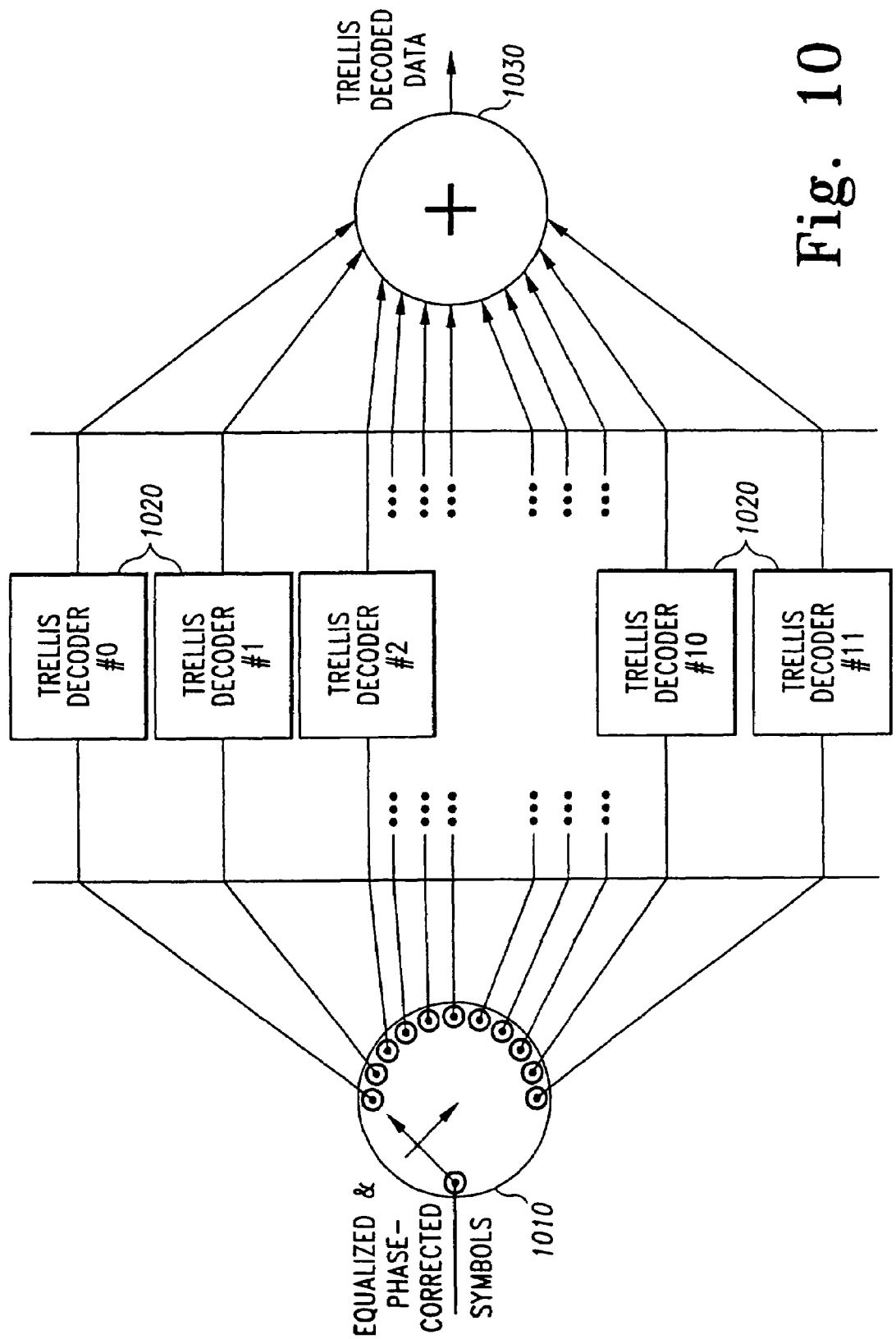
FIG. 10 is a diagram of a preferred embodiment trellis code de-interleaver according to the present invention.

FIG. 9 illustrates a trellis code and precoder intrasegment interleaver, shown generally at 900, that feeds a mapper such as the one shown in FIG. 4. Bytes are fed from the byte interleaver (or multiplexer) 910 to the trellis encoder and precoders 920, and they are processed as whole bytes by each of the twelve encoders 920. Each byte produces four symbols from a single encoder 920. A demultiplexer 930 reassembles these bytes into a single bit stream. The 8 VSB receiver uses 12 trellis decoders in parallel, each receiving every 12th symbol, as shown in FIG. 10. The bit stream is again interleaved by a multiplexer 1010, fed to the parallel decoders 1020, and then reassembled into a single bit stream by a demultiplexer 1030.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. An adaptive equalizer comprising:
a decision device producing a decision device output;
a decision feedback equalizer coupled to the decision device, the decision feedback equalizer producing a decision feedback output;
an Finite Impulse Response (FIR) filter coupled to the decision device; and
a trellis decoder coupled to the decision device, the trellis decoder producing a reliability output and a decoded output;
wherein an error signal is generated by subtracting the decision feedback output from the decision device output, the error signal being used to update coefficients of the taps of the FIR filter and the decision feedback equalizer; and
wherein a magnitude of the change to the coefficients is selected based at least in part on the reliability output of the trellis decoder.

2. The adaptive equalizer of claim 1, wherein the decision device comprises a slicer.

3. The adaptive equalizer of claim 1, wherein the trellis decoder comprises a Viterbi decoder.

4. The adaptive equalizer of claim 3, wherein the reliability output is determined by generating a soft output from each decoding stage of the Viterbi decoder, each soft output being equal to a difference between an accumulated metric of a survive path and a deleted path for the decoding stage, the soft output of a final decoding stage being used as the reliability output.

5. The adaptive equalizer of claim 4, wherein the decision device comprises a slicer.

6. An adaptive equalizer comprising:
a decision device;
an Finite Impulse Response (FIR) filter coupled to the decision device;
a decision feedback equalizer coupled to the decision device, the decision feedback equalizer producing a decision feedback output;
a trellis decoder coupled to the decision device, the trellis decoder producing a reliability output and a decoded output;
wherein an error signal is generated by delaying the decision feedback output and subtracting it from the decoded output; and
wherein a magnitude of change in coefficients of the taps of the FIR filter and the decision feedback equalizer is selected based at least in part upon the reliability output.

7. The adaptive equalizer of claim 6, wherein the decision device comprises a slicer.

8. The adaptive equalizer of claim 6, wherein the trellis decoder comprises a Viterbi decoder.

9. An adaptive equalizer having a plurality of coefficients adapted to provide an equalizer response, the adaptive equalizer comprising:
an equalizer output providing an equalizer output signal;
a decision device having
a decision device input operably coupled to the equalizer output; and
a decision device output producing a decision device output signal;
a decision feedback equalizer comprising
a decision feedback equalizer input operably coupled to the decision device output; and
a decision feedback equalizer output operably coupled to the decision device input;
an Finite Impulse Response (FIR) filter comprising
an FIR input receiving an information-bearing signal;
an FIR output operably coupled to the decision device input; and
a decision error signal created by operably combining the equalizer output signal and the decision device output signal;
an error-correction decoder comprising
an error-corrected symbol output producing an error-corrected symbol output signal; and
a symbol reliability output producing a symbol reliability signal related to the decision error signal;
a reliability-decision directed adaptation signal created by operably combining the decision error signal with the symbol reliability output signal;
means for adapting the plurality of coefficients of the adaptive equalizer;
wherein the reliability decision-directed adaptation signal is coupled operatively to said means for adapting the coefficients of the adaptive equalizer; and
wherein the coefficients of the adaptive equalizer are dependent, at least in part, upon the symbol reliability output of the error-correction decoder.

10. The adaptive equalizer of claim 9, wherein the error-correcting decoder comprises a trellis decoder.

11. The adaptive equalizer of claim 9, wherein the received information-bearing signal is in an Advanced Television Systems Committee (ATSC) signal.

12. The adaptive equalizer of claim 9, wherein the received information-bearing signal is broadcast as a Quadrature Amplitude Modulation (QAM) signal.

13. The adaptive equalizer of claim 9, wherein the received information-bearing signal is broadcast as an offset Quadrature Amplitude Modulation (QAM) signal.

14. An adaptive equalizer having a plurality of coefficients adapted to provide an equalizer response, the adaptive equalizer comprising:
an equalizer output providing an equalizer output signal;
a decision device comprising
a decision input operably coupled to the equalizer output; and
a decision output producing a decision device output signal;
a decision feedback equalizer comprising
a decision feedback equalizer input operably coupled to the decision output; and
a decision feedback equalizer output operably coupled to the decision device input;
an Finite Impulse Response (FIR) filter comprising
an FIR input; and
an FIR output operably coupled to the decision device input; and
an error-correcting decoder comprising
an error-corrected symbol output producing an error-corrected symbol output signal;
a symbol reliability output producing a symbol reliability output signal; and an error-correcting decoder input operably coupled to the decision input;
a symbol mapper operably coupled to the error-corrected symbol output signal and providing a mapped and scaled symbol output signal;
a decision error signal created by operably combining the equalizer output signal and the mapped and scaled symbol output signal;
a reliability-decision directed adaptation signal created by operably combining the decision error signal with the symbol reliability output;
means for adapting the coefficients of the adaptive equalizer;
wherein the reliability decision-directed adaptation signal error signal is operably coupled to said means for adapting the coefficients of the adaptive equalizer; and
wherein a magnitude of a change to the coefficients is dependent, at least in part, upon the symbol reliability output of the error-correction decoder.

15. The adaptive equalizer of claim 14, wherein the error-correcting decoder comprises a trellis decoder.

16. The adaptive equalizer of claim 14, wherein a received information-bearing input signal is in an Advanced Television Systems Committee (ATSC) signal.

17. The adaptive equalizer of claim 14, wherein a received information-bearing input signal is broadcast as a Quadrature Amplitude Modulation (QAM) signal.

18. The adaptive equalizer of claim 14, wherein a received information-bearing input signal is broadcast as an offset Quadrature Amplitude Modulation (QAM) signal.

19. A method for creating a reliability-decision directed adaptation signal for adapting an adaptive equalizer receiving an information bearing signal, and where the adaptive equalizer comprises
an equalizer output signal;
an error-corrected symbol output signal related to the equalizer output signal; and
a symbol reliability signal related to the error-corrected symbol output signal;
the method for creating the reliability-decision directed adaptation signal comprising the steps of:
(a) combining operatively the error-corrected symbol output signal and the equalizer output signal to produce a decision error signal; and
(b) combining operatively the decision error signal and the symbol reliability signal to produce the reliability-decision directed adaptation signal.

20. The method of claim 19, further comprising the step of:
(c) passing the received information-bearing signal through the adaptive equalizer to form the equalizer output signal.

21. The method of claim 20, wherein the received information-bearing signal is in an Advanced Television Systems Committee (ATSC) signal.

22. The method of claim 20, wherein the received information-bearing signal is broadcast as a Quadrature Amplitude Modulation (QAM) signal.

23. The method of claim 20, wherein the received information-bearing signal is broadcast as an offset Quadrature Amplitude Modulation (QAM) signal.

24. The method of claim 20, further comprising the steps of:
(d) decoding the equalizer output signal to produce a decoded symbol; and
(e) error-correcting the decoded symbol to produced the error-corrected symbol output signal.

25. The method of claim 24, wherein the error-corrected symbol output signal is formed by passing the decoded symbol through a trellis decoder.

26. The method of claim 20, the further comprising the steps of:
(d) decoding the equalizer output signal to produce a decoded symbol; and
(e) error-correcting the decoded symbol to form the error-corrected symbol output signal and the symbol reliability signal, wherein the symbol reliability signal is derived from a metric produced in conjunction with the error-correcting step.

27. The method of claim 26, wherein step (e) further comprises the steps of:
(e.1) passing the decoded symbol through a trellis decoder;
(e.2) generating a soft output from each decoding stage of the trellis decoder, wherein the soft output is equal to a difference between an accumulated metric of a survive path and a deleted path for the respective decoding stage; and
(e.3) using the soft output of a final decoding stage as a reliability output to form the symbol reliability signal corresponding to the error-corrected symbol output signal.

28. A method for adapting an adaptive equalizer comprising a plurality of coefficients and a means for adapting the plurality of coefficients, wherein adapting the plurality of coefficients includes a step size, the method comprising the steps of:
(a) passing a received information-bearing signal through an adaptive equalizer to produce an equalizer output signal;
(b) decoding the equalizer output signal to produce a decoded symbol signal;
(c) error-correcting the decoded symbol signal to produce an error-corrected decoded symbol signal and a symbol reliability signal, wherein the symbol reliability signal is related to the likelihood that the error-corrected decoded symbol signal is error free;
(d) modifying the plurality of coefficients in response to the symbol reliability signal; and
(e) modifying the step size in relation to a magnitude of the symbol reliability signal.

29. The method of claim 28, further comprising the steps of:
(e) operably combining the equalizer output signal and the error-corrected decoded symbol signal to form a decision error signal;
(f) using the symbol reliability signal to scale the decision error signal to form a reliability-decision directed adaptation signal; and
(g) using the reliability-decision directed adaptation signal to control the modifying of the coefficient of the adaptive equalizer.

30. The method of claim 28, further comprising the steps of:
(e) mapping the error-corrected decoded symbol signal to form a mapped output symbol signal;
(f) operably combining the equalizer output signal and the mapped output symbol signal to form a decision error signal;
(g) using the symbol reliability signal to scale the decision error signal to form a reliability-decision directed adaptation signal; and
(h) using the reliability-decision directed adaptation signal to control the modifying of the coefficients of the adaptive equalizer.

31. The method of claim 30, wherein the step of modifying the plurality of coefficients comprises a step size, the method further comprising the step of:
(i) using the reliability-decision directed adaptation signal to adjust the magnitude of the step size.

32. An adaptive equalizer for receiving an information bearing signal, the adaptive equalizer comprising:
a plurality of coefficients governing a response of the adaptive equalizer;
means for modifying said plurality of coefficients of the adaptive equalizer, the means for modifying the plurality of coefficients further including a step size; and
an error-correcting decoder providing a symbol reliability signal, wherein said symbol reliability signal is coupled operatively to the means for modifying said coefficients, and wherein said symbol reliability signal is operably coupled to the step size; and
whereby,
a magnitude of the symbol reliability signal is used to adapt the plurality of coefficients, and
wherein the magnitude of the adaptation applied to the plurality of coefficients is governed by the symbol reliability signal.

33. The adaptive equalizer of claim 32, wherein the adaptive equalizer further comprises:
a decision error signal operably combined with the symbol reliability signal to form a reliability-decision directed adaptation signal;
wherein the reliability-decision directed adaptation signal is operatively coupled to the means for modifying said plurality of coefficients; and
whereby, the coefficients are adapted in response to the reliability-decision directed adaptation signal.

34. A method for creating a reliability-decision directed adaptation signal for adapting an adaptive equalizer receiving an information bearing signal, the adaptive equalizer comprising:
an equalizer output signal;
a decision device output signal; and
a symbol reliability signal related to the decision device output signal;
the method for creating the reliability-decision directed adaptation signal comprising the steps of:
(a) operably combining the decision device output signal and equalizer output signal to create a decision error signal; and
(b) operably combining the decision error signal and the symbol reliability signal to produce the reliability-decision directed adaptation signal.

35. The method of claim 34, further comprising the steps of:
(c) mapping an error-corrected symbol output to produce a mapped symbol output; and
(d) subtracting the equalizer output signal from the mapped symbol output to produce the decision error signal.

36. The method of claim 35, further comprising the steps of:
- (e) developing a metric corresponding to the confidence that a decoder device output signal is error free; and
- (f) using the metric to create the symbol reliability signal related to the decoder device output signal.

37. The method of claim 34, wherein step (b) further comprises the steps of:
- (b.1) passing the decoded symbol through a trellis decoder;
- (b.2) generating a soft output from each decoding stage of the trellis decoder, each soft output being equal to the difference between an accumulated metric of a survive path and a deleted path for the decoding stage; and
- (b.3) using the soft output of a final decoding stage as the reliability output to form the symbol reliability signal corresponding to the error-corrected symbol output.

38. A method for adapting a response of an adaptive equalizer receiving an information-bearing signal, the adaptive equalizer comprising
- a plurality of coefficients; and
- means for modifying the plurality of coefficients;

the method for adapting the adaptive equalizer comprising the steps of:
- (a) passing the information-bearing signal through the adaptive equalizer to produce an equalizer output signal;
- (b) decoding the equalizer output signal to produce a decoder symbol signal;
- (c) error-correcting the decoder symbol signal to produce an error-corrected decoder symbol signal;
- (d) developing a metric related to a confidence that the error-corrected decoder symbol signal is error free;
- (e) using the metric to produce a symbol reliability signal related to the error-corrected decoder symbol;
- (f) forming a reliability-decision directed adaptation signal related to said error-corrected decoder symbol signal by operably combining the equalizer output signal, error-corrected decoder symbol signal and the symbol reliability signal; and
- (g) using the reliability-decision directed adaptation signal to control the means for modifying the plurality of coefficients, whereby the adaptive equalizer is adapted.

39. The method of claim 38, wherein step (f) further comprises the steps of:
- (f.1) operably combining the equalizer output signal and error-corrected decoder symbol signal to produce a decision error signal related to said equalized output signal; and
- (f.2) operably combining the decision error signal and the symbol reliability signal to produce the reliability-decision directed adaptation signal.

40. The method of claim 38, wherein, step (f) further comprises the steps of:
- (f.1) mapping and scaling the error-corrected decoder symbol signal to create a mapped and scaled error-corrected symbol signal;
- (f.2) subtracting operably the equalized output signal from the mapped and scaled error-corrected symbol signal to produce the decision error signal related to said equalized output signal; and
- (f.3) using the symbol reliability signal to scale the decision error signal to form the reliability-decision directed adaptation signal.

41. The method of claim 40, wherein the received information-bearing signal is in an Advanced Television Systems Committee (ATSC) signal.

42. The method of claim 40, wherein the received information-bearing signal is broadcast as a Quadrature Amplitude Modulation (QAM) signal.

43. The method of claim 40, wherein the received information-bearing signal is broadcast as an offset Quadrature Amplitude Modulation (QAM) signal.

44. A method for adapting the response of an adaptive equalizer, the adaptive equalizer receiving an information-bearing signal, the adaptive equalizer comprising
- a plurality of coefficients; and
- a means for modifying the plurality of coefficients;

the method for adapting the adaptive equalizer comprising the steps of:
- (a) passing the information-bearing signal through the adaptive equalizer to produce an equalizer output signal;
- (b) decoding the equalizer output signal to produce a decoder symbol signal;
- (c) error-correcting the decoder symbol signal to produce an error-corrected decoder symbol signal;
- (d) developing a metric related to a likelihood that the error-corrected decoder symbol signal is error free;
- (e) using the metric to produce a symbol reliability signal related to the error-corrected decoder symbol;
- (f) forming a reliability-decision directed adaptation signal related to said error-corrected decoder symbol signal by operably combining the equalizer output signal, the error-corrected decoder symbol signal and the symbol reliability signal; and
- (g) using the reliability-decision directed adaptation signal to control the means for modifying the plurality of coefficients, whereby the adaptive equalizer is adapted.

45. The method of claim 44, step (f) further comprises the steps of:
- (f.1) mapping and scaling the error-corrected decoder symbol signal to create a mapped and scaled error-corrected decoder symbol signal;
- (f.2) subtracting operably the equalizer output signal from the mapped and scaled error-corrected decoder symbol signal to produce the decision error signal related to said equalized output signal; and
- (f.3) using the symbol reliability signal to scale the decision error signal to form the reliability-decision directed adaptation signal.

46. The method of claim 44, wherein the received information-bearing signal is in an Advanced Television Systems Committee (ATSC) signal.

47. The method of claim 44, wherein the received information-bearing signal is broadcast as a Quadrature Amplitude Modulation (QAM) signal.

48. The method of claim 44, wherein the received information-bearing signal is broadcast as an offset Quadrature Amplitude Modulation (QAM) signal.

* * * * *

UNITED STATES PATENT AND TRADEMARK OFFICE
CERTIFICATE OF CORRECTION

PATENT NO.       : 7,130,344 B2
APPLICATION NO.  : 10/701047
DATED            : October 31, 2006
INVENTOR(S)      : Xia et al.

It is certified that error appears in the above-identified patent and that said Letters Patent is hereby corrected as shown below:

<u>Column 3</u>
line 49, delete "4" and insert --±4--

<u>Column 8</u>
In claim 6, line 49, delete "Impluse" and insert --Impulse--

<u>Column 9</u>
In claim 9, line 15, delete "Impluse" and insert --Impulse--
In claim 14, line 64, delete "Impluse" and insert --Impulse--

Signed and Sealed this

Twenty-third Day of January, 2007

JON W. DUDAS
*Director of the United States Patent and Trademark Office*